(12) United States Patent
Stieglitz et al.

(10) Patent No.: US 7,676,216 B2
(45) Date of Patent: Mar. 9, 2010

(54) DYNAMICALLY MEASURING AND RE-CLASSIFYING ACCESS POINTS IN A WIRELESS NETWORK

(75) Inventors: Jeremy Stieglitz, Menlo Park, CA (US); Timothy S. Olson, San Jose, CA (US); Pejman D. Roshan, Anaheim, CA (US)

(73) Assignee: Cisco Technology, Inc., San Jose, CA (US)

( * ) Notice: Subject to any disclaimer, the term of this patent is extended or adjusted under 35 U.S.C. 154(b) by 1020 days.

(21) Appl. No.: 11/188,564

(22) Filed: Jul. 25, 2005

(65) Prior Publication Data

US 2006/0193284 A1    Aug. 31, 2006

Related U.S. Application Data

(63) Continuation-in-part of application No. 11/066,009, filed on Feb. 25, 2005.

(51) Int. Cl.
*H04M 1/66* (2006.01)
*H04W 24/00* (2009.01)
*H04L 12/28* (2006.01)

(52) U.S. Cl. ............... 455/410; 455/411; 455/456.2; 370/255

(58) Field of Classification Search ............ 455/410, 455/411, 456.2; 370/255

See application file for complete search history.

(56) References Cited

U.S. PATENT DOCUMENTS

| 7,116,988 B2 * | 10/2006 | Dietrich et al. | 455/456.1 |
| 2003/0219129 A1 | 11/2003 | Whelan et al. | 380/270 |
| 2004/0042410 A1 | 3/2004 | Harris et al. | 370/252 |
| 2004/0120260 A1 | 6/2004 | Bernier et al. | 370/252 |
| 2005/0073979 A1 * | 4/2005 | Barber et al. | 370/338 |
| 2005/0259611 A1 * | 11/2005 | Bhagwat et al. | 370/328 |
| 2006/0068811 A1 * | 3/2006 | Adya et al. | 455/456.2 |

* cited by examiner

*Primary Examiner*—Nick Corsaro
*Assistant Examiner*—Shannon R Brooks
(74) *Attorney, Agent, or Firm*—Dov Rosenfeld; Inventek

(57) ABSTRACT

A method, an apparatus, and a carrier medium carrying computer readable code segments to instruct a processor to execute the method. The method is in a wireless network that includes at least one access point. The method includes, from time-to-time, measuring a first set of at least one property of each access point of a set of at least one classified access point of the wireless network. The method further includes re-classifying each access point based on at least one function of a second set of at least one property of the access point, the second set of properties including the first set of properties. The set of at least one access point is classified according to a set of AP classifications, and the re-classifying is into one of the AP classifications.

26 Claims, 4 Drawing Sheets

DYNAMICALLY MEASURING AND RE-CLASSIFYING ACCESS POINTS IN A WIRELESS NETWORK

The present invention is a continuation-in-part of U.S. patent application Ser. No. 11/066,009 filed 25 Feb. 2005 to inventors Winget, et al., titled LOCATION BASED ENHANCEMENTS FOR WIRELESS INTRUSION DETECTION, assigned to the assignee of the present invention. The contents of U.S. patent application Ser. No. 11/066,009 are incorporated herein by reference.

BACKGROUND

The present invention relates to wireless networks, and in particular to a method to dynamically measure properties of and re-classify an access point in an infrastructure wireless local area system (WLAN).

WLANs have recently become popular, in particular WLANS that comply with the IEEE 802.11 standard. Such a standard provides for ad-hoc networks wherein any wireless station can directly communicate with any other wireless station, and also for infrastructure networks in which one station, called the access point (AP) acts as a base station for a set of client stations. Thus, an AP forms a cell in which any of its client stations (or a repeater) may communicate with the AP. Any client station communicates only via its access point to another client station or to any part of the network, e.g., a wired network that may be connected to one of the access points.

WLANs allow companies to extend the benefits of networks to mobile workforces, as well as deliver new networking service and applications wirelessly. One of the challenges that a company face in deploying wireless networks is security, including preventing a "foreign" wireless device to connect as a rogue access point to the company's networks.

Some security problems specific to WLANs arise from wireless client stations requesting access to the various APs. Often in a deployment of a WLAN environment, AP cells' coverages are overlapped to achieve maximum RF coverage to reduce nonservice spots. Wireless client stations can move between APs, and thus change the RF environment of the WLAN depending on their location. Additionally, WLANs are often required to grow with increased demand as more and more client stations require service from the WLAN. Expanding the WLAN requires reconfiguring equipment, adding APs, and placing APs in locations that do not conflict with other APs or otherwise complicate managing the WLAN.

Because wireless is an open medium, anyone can contend for access and send information over a wireless channel.

A wireless network typically uses management frames at the MAC layer designed, sent, and received for management purposes. For example, in a WLAN that conforms to the IEEE 802.11 standard, an AP regularly transmits beacon frames that announce the AP's presence, i.e., advertises the AP's services to potential clients so that a client may associate with the AP. Similarly, a client can send a probe request frame requesting any AP in its radio range to respond with a probe response frame that, in a similar manner to a beacon frame, provides information for the requesting client (and any other radios in its radio range and able to receive its channel) sufficient for a client to decide whether or not to associate with the AP.

IEEE 802.11 management frames are typically sent without any protection, some management frame protection methods have recently been proposed. With unprotected management frames, an attacker can therefore easily spoof a legitimate AP, sending directives to client stations as if it were the AP serving the client stations. For example, nearly all attacks begin with an attacker spoofing as an AP by sending disassociation or de-authentication requests to a client station.

Thus, there has been a need for methods and equipment to efficiently protect a WLAN and provide WLAN managers with information needed to make management and access control decisions. In particular, because many customers of WLANs do not control which types of devices can connect to wired Ethernet networks and to wireless networks, such customers are facing the difficult challenge of controlling whether, when, and how access points are deployed in their environment. Often times, users will plug in unapproved wireless access points to deliver wireless networks that are not corporate-sanctioned and/or available from the corporate information technology department. Less often, but of more serious concern, are network attackers that, at one time, place access points inside a corporate network, and at a different time, perhaps from a different location, use that unapproved access point to gain illegitimate access to the corporate network.

Rogue Access Point Detection Systems (RAPDS), also called Wireless Intrusion Detection Systems (WIDS), are known and provide for managing some aspects of wireless RF security. Aspects of such systems include the ability to detect, locate, alert, and ideally, shut down rogue access points on their networks. These systems generally utilize a tiering model of classification for access points, with categorizations of access points as known and managed APs (called managed APs herein), known APs that are in the neighborhood of the managed network or that are known to clients of managed APs, i.e., to managed clients, and that are known to not cause problems, e.g. interference, to the managed wireless network. Such APs are called friendly APs. One example of a friendly AP is an AP at a coffee shop where an employee of the enterprise often works using a computer that is a managed client and that associates with this friendly AP. Finally, there are unknown and/or known-to-be "rogue" APs (collectively called rogue APs herein).

An overview of some rogue AP detection methods is provided in the DETAILED DESCRIPTION section herein below.

What these rogue AP detection systems lack are dynamic capabilities to classify, and re-classify an AP into one of a category of a categorization scheme should AP behaviors change.

As an example, a particularly clever attacker could take advantage of known rogue AP detection systems to place an access point nearby a corporate network, with an expectation that over time, that access point would be labeled as a "friendly AP." This attacker could then move this access point inside a corporate network and use this access point as a "Trojan horse" and avoid detection through typical rogue AP detection systems.

Thus there is a need in the art to for a method to measure, cause a radio scan, and cause a reclassification of access points that have already been classified in a managed wireless network.

SUMMARY

One aspect of the present invention is using a full range of active, over-the-air detection, location, and measurement systems to proactively and dynamically re-classify the status of all known, discovered, managed or classified access points.

In particular, described herein are a method, an apparatus, and a carrier medium carrying computer readable code segments to instruct at least one processor of a processing system to execute the method. The method is in a wireless network that includes at least one access point. The method includes, from time-to-time, measuring a first set of at least one property of each access point of a set of at least one classified access point of the wireless network. The method further includes re-classifying each access point based on at least one function of a second set of at least one property of the access point, the second set of properties including the first set of properties. The set of at least one access point is classified according to a set of AP classifications, and the re-classifying is into one of the AP classifications.

By using the invention, one could possibly achieve:
1. Improved security.
2. A reduction of false positives.
3. Automatic self-defending against attacks by rogue access points.

Any wireless rogue AP detection system that detects and classifies access points, e.g., as rogue access points could use an embodiment of the invention.

Other aspects and features would be clear form the description and drawings.

DETAILED DESCRIPTION

Described herein are a method, a system, and a software program in a carrier medium to use active, wireless station detection, station location, and radio measurements to re-classify the status of all known "friendly" access points, managed access points, newly discovered access points, rogue access points, or otherwise classified access points.

Managed Networks

The present invention will be described with reference to a representative wireless network that substantially conforms to the IEEE 802.11 standard such as, e.g., 802.11a, 802.11b, 802.11g, or currently envisioned standards such as 802.11n. By substantially conforming we mean compatible with. The reader of this description is assumed to have access to the documents defining these standards, and all of the documents defining these standards are incorporated herein by reference in their entirety for all purposes. In the example discussed herein, a region to be covered by a wireless network is divided into cells with each cell having an access point (AP). Clients are associated with a particular access point and can communicate to and from the network via that access point.

Figure 1:
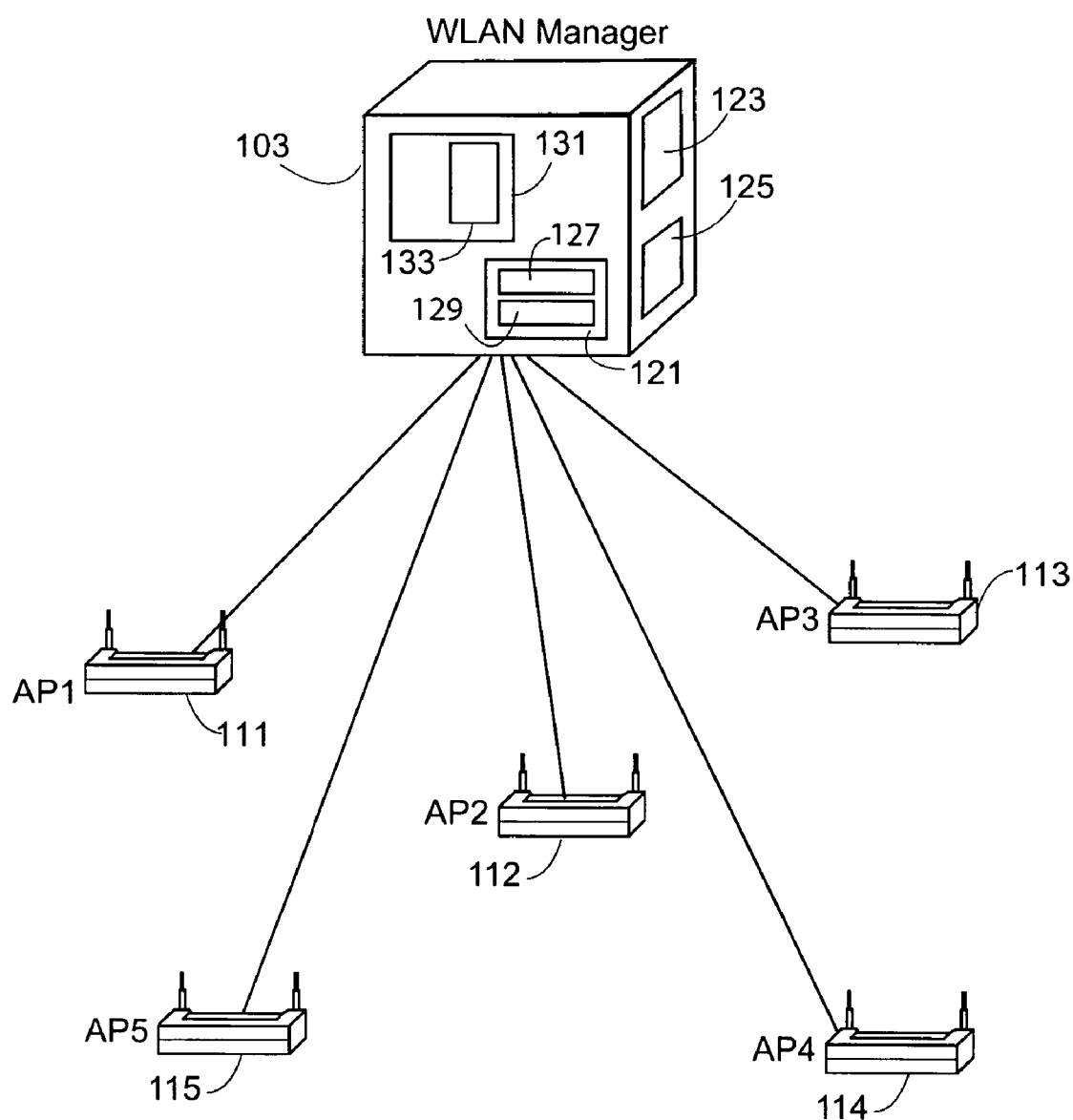
FIG. 1 shows a simplified managed network that includes a WLAN manager and APs implementing several aspects of the present invention.

FIG. 1 depicts a representative wireless communications network 100 to which embodiments of the present invention may be applied. There are five access points shown: AP1 (111), AP2 (112), AP3 (113), AP4 (114) and AP5 (115). Each AP may have numerous associated clients (not shown). In one embodiment, each of the APs is part of a managed wireless network, and is a managed AP in the sense that each AP is in communication with a management entity of a managed wireless network.

Depending on the size and complexity, a managed network is either a set of APs with a central control entity, or a hierarchical structure with a set of hierarchical control domains that eventually are coupled to a set of APs. Each control domain is managed by a management entity we call a manager herein. The number of levels in the hierarchy depends on the complexity and/or size of the network, and thus not all managed networks have all levels of control. For example, a simple managed network may only have one level of control with a single management entity controlling all the APs. Factors that influence the selection of control domains include one or more of: the various types of IP subnet configurations; the radio proximity of the access points; the client station roaming patterns; the real time roaming requirements; and the physical constraints of the network (e.g. campus, building, and so forth).

In one embodiment, a managed AP has several properties, including the ability to accurately measure its received power level, called the radio signal strength indication (RSSI) herein. A managed AP also has the ability to receive instructions from the WLAN manager to set its transmit power and the transmit frequency in the form of a channel number according to the received instruction.

Some aspects of the IEEE 802.11 standard are modified slightly to accommodate some management aspects of the managed APs. In one embodiment, managed stations of the network such as managed APs are able to measure the received signal strength (called received signal strength indication, or RSSI herein) relatively accurately. Managed access points furthermore transmit at known transmit powers.

For more information on radio management, see U.S. patent application Ser. No. 10/766,174 file Jan. 28, 2004 to inventors Olson, et al., titled A METHOD, APPARATUS, AND SOFTWARE PRODUCT FOR DETECTING ROGUE ACCESS POINTS IN A WIRELESS NETWORK, assigned to the assignee of the present invention, and incorporated herein by reference.

In this description, assume a single management entity called the WLAN Manager 103 is assumed. The WLAN Manager 103 manages several aspects of the wireless network, including, in one embodiment, generating the radio plan including assigning the transmit powers and the transmit channels for each of the APs. In other embodiments, management entities we call Subnet Context Managers may be included, each controlling some aspects of a single subnet or virtual local area network (VLAN). A Subnet Context Manager, for example, may relay instructions from the WLAN manager 103 to all managed APs in its subset or VLAN. In the embodiment shown herein, however, the functions of the subnet context manager are carried out by the WLAN Manager. Other embodiments may have a different number of levels in the hierarchy with different levels of management. For more information on radio management, see U.S. patent application Ser. No. 10/766,174 file Jan. 28, 2004 to inventors Olson, et al., titled A METHOD, APPARATUS, AND SOFTWARE PRODUCT FOR DETECTING ROGUE ACCESS POINTS IN A WIRELESS NETWORK, assigned to the assignee of the present invention, and incorporated herein by reference.

Note that a controller we call the Radio Manager, which in the embodiment described herein is within the WLAN manager 103, provides intelligent centralized control of various aspects of the radio environment within a given set of APs. A single Radio Manager handles the radio aspects of all the APs within a given WLAN "Local Control Domain" or the WLAN "Campus Control Domain" depending on the number of tiers in the management structure, e.g., whether Local Control Domains and/or Campus Control Domains exist. The Radio Manager provides the ability to determine network wide radio parameters during initial network deployment and network expansion, called radio planning. The Radio Manager centrally coordinates all client and AP measurements, e.g., in order to detect rogue access points.

In one embodiment, the WLAN manager 103 authorizes the set of managed access points in the network, including maintaining a database called the Configuration database that contains configuration parameters such as the radio plan that assigns frequencies and transmit powers and other configuration parameters such as beacon intervals to the APs under its control. The Configuration Database also includes an AP database that includes information on the managed APs, e.g., a list of the managed APs together with some data related to these APs, such as the location of the APs and the power the APs are able to transmit at, and any classification of the APs. The WLAN manager 103 provides centralized control of various aspects of the radio environment within a given set of APs, including performing measurements to obtain path losses, and using these path loss items of information to determine the location of APs and/or clients, and further, to determine the radio plan including network wide radio parameters such as transmit powers and channels during initial network deployment and network expansion.

As an example, in one embodiment, the path loss information is obtained by one or more walkthroughs, while in another, the path loss information is also, or alternately obtained by performing path loss measurements automatically between the APs. See for example above-mentioned U.S. patent application Ser. No. 10/766,174 and in U.S. patent application Ser. No. 10/629,384 titled "RADIOLOCATION USING A PATH LOSS DATA," filed Jan. 28, 2004 to inventors Kaiser, et al., assigned to the assignee of the present invention, and incorporated herein by reference.

Note that the invention does not require there to be a single WLAN manager entity. The functionality described herein may be incorporated into any of other management entities, e.g., at a local level, or by a separate manager called the Radio Manager that controls the radio aspects of the WLAN. Furthermore, any of these management entities may be combined with other functionalities, e.g., switching, routing, and so forth.

Returning now to FIG. 1, a simple managed network is shown. All management functions, including radio plan generation, are assumed incorporated into a single management entity—a WLAN manager 103—that has access to the AP Database.

In one embodiment, the WLAN manager 103 includes a processing system 123 with one or more processors and a memory 121. The memory 121 is shown to include instructions 127 that cause one or more processors of the processing system 123 to implement the WLAN management aspects of the invention, including the generation of a radio plan for the network, including assigning a frequency in the form of a transmission channel, and assigning of transmit power to each access point. The WLAN management instructions 127 further include the radio measurement aspects described herein that are used for radio planning and also for classifying APs into managed APs, other types of APs, including suspected rogue APs. The memory 121 is also shown to include instructions 129 that cause one or more processors of the processing system 123 to implement the rogue AP detection and dynamic re-classification aspects of the invention described herein. It would be clear to those in the art that not all of these programs that so implement these aspects are in the memory at the same time. However, they are so shown in the memory in order to keep the description simple.

The WLAN manager 103 also maintains the Configuration database 131, and within it, the AP database 133.

The WLAN manager 103 includes a network interface 125 for coupling to a network, typically wired or otherwise connected. In one embodiment, the WLAN manager 103 is part of a network switch and operated under a network operating system, in this case IOS (Cisco Systems, Inc., San Jose, Calif.).

The WLAN manager 103 is coupled via its network interface 125 and a network (typically a wired network) to the set of managed APs: AP1, . . . , AP5 with reference numerals 111, . . . , 115, respectively.

Figure 2:
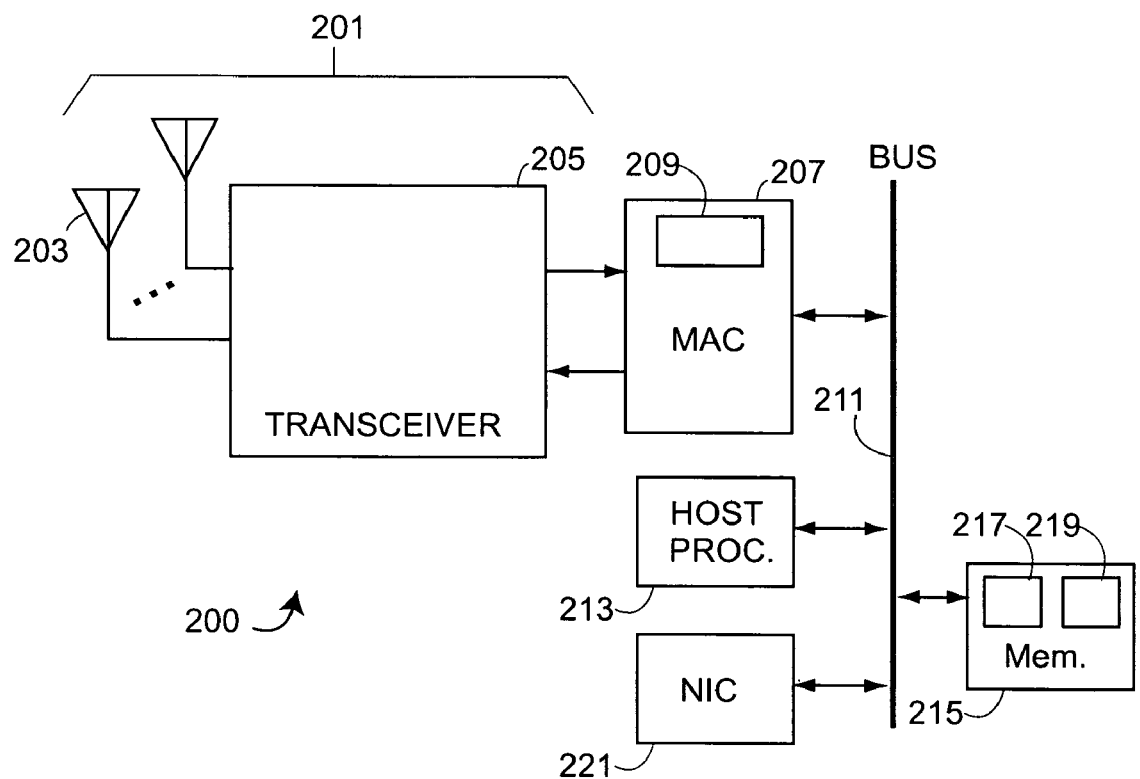
FIG. 2 shows a simple block diagram of one embodiment of a wireless station that may be an AP or a client station and that implements one or more aspects of the invention.

FIG. 2 shows one embodiment of a wireless station 200 that may be an AP or a client station and that implements one or more radio measurement aspects of the present invention. While a wireless station such as station 200 is generally prior art, a wireless station that includes aspects of the present invention, e.g., in the form of software, and that can understand any special management frames used to implement aspects of the present invention, is not necessarily prior art. The radio part 201 includes one or more antennas 203 that are coupled to a radio transceiver 205 including an analog RF part and a digital modem. The radio part thus implements the physical layer (the PHY). The digital modem of PHY 201 is coupled to a MAC processor 207 that implements the MAC processing of the station. The MAC processor 207 is connected via one or more busses, shown symbolically as a single bus subsystem 211, to a host processor 213. The host processor includes a memory subsystem, e.g., RAM and/or ROM connected to the host bus, shown here as part of bus subsystem 211. Station 200 includes an interface 221 to a wired network.

In one embodiment, the MAC processing, e.g., the IEEE 802.11 MAC protocol is implemented totally at the MAC processor 207. The Processor 207 includes a memory 209 that stores the instructions for the MAC processor 207 to implement the MAC processing, and in one embodiment, some or all of the additional processing used by the present invention. The memory is typically but not necessarily a ROM and the software is typically in the form of firmware.

The MAC processor is controlled by the host processor 213. In one embodiment, some of the MAC processing is implemented at the MAC processor 207, and some is implemented at the host. In such a case, the instructions (the code) for the host 213 to implement the host-implemented MAC processing are stored in the memory 215. In one embodiment, some or all of the additional processing used by the present invention is also implemented by the host. These instructions are shown as part 217 of the memory.

According to one aspect of the invention, each station such as station 200 maintains a database of the beacons and probe responses it receives. Beacons and probe responses are stored in the database under one or more circumstances, e.g., when the station determines whether or not to associate with an AP. In the context of aspects of the present invention, beacons and probe responses received at the station are stored in the database as a result of an active scan or a passive scan. We call this database the Beacon Table. As shown in FIG. 2, in one embodiment, the Beacon Table 219 is in the memory 215 of the station. Other embodiments store the Beacon Table 219 outside of memory 215. A station stores the information on the beacons and probe responses in its Beacon Table 219, and further stores additional information about the state of the station when it receives the beacon.

According to an aspect of the invention, a station such as station 200 when implementing an AP is capable of passive scanning. According to yet another aspect of the invention, a station such as station 200 when implementing a client station is capable of passive scanning.

Because the station stores beacons and probe responses it has received in its Beacon Table, one form of passive scanning includes simply reporting the accumulated contents of the station's Beacon Table. Note that an alternate embodiment may alternately include the station's listening for a specified period of time and reporting the incremental Beacon Table information for the specified period of time.

According to yet another aspect, a station such as station 200 when implementing an AP is capable of active scanning, in particular incremental active scanning. To carry out an incremental active scan, the AP vacates its serving channel and probes one or more channels by sending a probe request frame on that/those channel(s). The AP prevents client transmissions by scheduling a contention free period (CFP). Alternatively the AP can prevent client transmissions by transmitting an unsolicited CTS frame with a duration long enough to cover the active scan time. According to yet another aspect, station 200 when implementing a client is capable of active scanning, in particular incremental active scanning. To carry out an incremental active scan, the client station vacates its serving channel and probes one or more channels by sending a probe request frame on that/those channel(s). In the case of a client, the active scan includes reporting back the results of probing the other channel(s). In order to prevent client transmissions from the serving AP, the client must indicate that it is in a power save mode. Alternatively, the client can use specific local knowledge such as application operation to assure that the AP will not send any transmissions directed at the client.

Scanning includes storing the information from beacons and probe responses received at the station, e.g., by passive or active scanning in the Beacon Table.

Rogue AP Detection Systems

As stated in the BACKGROUND section above, Rogue Access Point Detection Systems (RAPDS) are known and provide for managing some aspects of wireless RF security. Depending on the particular system, a RAPDS uses one or more over-the-air and/or through Ethernet local area networks (LANs) techniques to detect the presence of access points and to classify whether or not a detected access point is a rogue access point. These systems include various methods to classify an access points such as: by MAC address, by configuration, by RSSI, by location, by IP address properties, and so forth, into one of a set of classes, e.g., managed APs, friendly APs, or (likely) rogue APs.

Known methods for detecting rogue access points include having clients report failed authentication attempts on other APs, or detecting failed authentication attempts by the APs themselves. For example, an authentication tattletale method is known for reporting rogue access points. See U.S. patent application Ser. No. 09/917,122 titled "ROGUE AP DETECTION" to Halasz, et al., filed Jul. 27, 2001, assigned to the assignee of the present invention, and incorporated herein by reference. Such a prior-art method typically includes configuring a station with the appropriate identifier of the WLAN—a service set identifier (SSID)—to make an authentication attempt. Only rogues that are in the proper location to the clients i.e., in radio contact for an attempt at authentication can be detected. This can result in a delayed detection or no detection at all.

Other known rogue detection methods include using some type of sniffer device that can be carried in the WLAN coverage area. An operator periodically walks the WLAN coverage with the sniffer device making measurements to search for rogue APs. See, for example, "AiroPeek and Wireless Security: Identifying and Locating Rogue Access Points" from WildPackets, Inc., Walnut Creek, Calif. (version dated Sep. 11, 2002).

Also known is a sniffer technique that uses APs as sniffers. See, for example, the document "AirWave Rogue Access Point Detection," from AirWave Wireless, Inc., San Mateo, Calif. (www.airwave.com). Such APs are managed from a central location by a management entity. Most of the time, such a managed AP acts as regular access point. When a rogue scan is being conducted, a management entity issues a command, e.g., an SNMP command to the managed AP, converting it into a wireless sniffer. The managed AP scans the airwaves within its coverage radius, looking for traffic on all channels. The AP then reports all data back to the management entity as a trace, and then returns to normal operation mode. The management entity analyzes the traces from managed APs and sentry devices, comparing the detected APs to its database of authentic, managed APs. Such a method, however, requires the AP to cease normal operation.

Also known are rogue AP detection techniques are known that require having a connection, e.g., a wired connection to the rogue AP. However, because a rogue AP may be a device installed at a neighboring location, detection methods that require a wired connection may not always succeed.

One example of a method and apparatus for detecting and even locating rogue access points is described in co-pending U.S. patent application Ser. No. 10/766,174 filed Jan. 28, 2004 to inventors Olson, et al., titled "A METHOD, APPARATUS, AND SOFTWARE PRODUCT FOR DETECTING ROGUE ACCESS POINTS IN A WIRELESS NETWORK," assigned to the assignee of the present invention. The contents of U.S. patent application Ser. No. 10/766,174 are incorporated herein by reference. The inventions therein are individually and collectively called "Our Rogue Detection Invention" herein.

Our Rogue Detection Invention of U.S. patent application Ser. No. 10/766,174 describes how passive and/or active scanning by APs, under instruction by the WLAN manager 103, leads to APs receiving beacons and probe responses, which in turn leads to the WLAN manager 103 identifying potential rogue APs using the beacons and/or probe responses detected by the passive or active scanning and reported back to the WLAN manager 103. By passive scanning, we mean listening for beacons and probe responses without first transmitting a probe request. The use of passive scanning is an important aspect of the invention because it provides for rogue detection concurrent with normal processing at the station, e.g., at the AP. By active scanning, we mean transmitting a probe request prior to listening for beacons and probe responses. Both active and passive scanning can occur on the same channel used for wireless communication (the "serving" channel) or other channels ("non-serving" channels). For non-serving channels typically an active scan is used.

According to one variant of the Rogue Detection Invention, the WLAN manager 103 receives reports from a managed AP of any transmissions of beacons or probe responses received at the managed AP, including those that were transmitted by a potential rogue AP. According to another variant of the Rogue Detection Invention, the WLAN manager 103 receives reports from a managed AP of any transmissions of beacons or probe responses received at one or more clients of the managed AP, including those that were transmitted by a potential rogue AP. The WLAN manager 103 receives reports from its managed APs, and uses the reports to determine, e.g., by looking up the WLAN database, if the potential rogue station is likely to be a rogue. In one version, the analyzing includes ascertaining if the MAC address of the AP that sent a beacon or probe response matches a MAC address of an AP in the AP database to ascertain whether or not the AP is a potential rogue AP, or a managed AP, or friendly AP. The approximate location of the rogue, e.g., to within an area of interest such as a floor of a building, or even finer, is determined from knowledge of the location of the managed APs receiving the beacons or probe responses, or from the inferred knowledge of the location of the managed clients receiving the beacons or probe responses.

In one embodiment, the information reported to the AP manager (or other entity that classifies APs) includes, for each detected AP, information about the detection, and information about or obtained from contents of the beacon/probe response. The detection information includes one or more of:

The detected AP's BSSID, e.g., in the form of a MAC address.

The channel any beacon or probe response from the AP was received on.

The MAC address of the receiving station.

The signal strength, e.g., RSSI detected at the PHY of the receiver of the beacon/probe response.

Any other measures of received signal quality of the received beacon/probe response available at the PHY of the receiving station.

Received beacons and probe responses from other APs. This may help locate the detecting station.

The beacon/probe response information sent includes one or more of:

The SSID in the beacon or probe response.

Beacon time (TSF timer) information. In one embodiment, this is sent in the form of TSF offset determined by comparing the timestamp in the beacon/probe response with the TSF timer at the managed AP receiving the response or at the managed client receiving the response.

Configuration parameters included in the received beacon/probe response.

Note that some of this information is beyond what was, as of June 2003, proposed for IEEE 802.11h. Further note that while the IEEE 802.11 standard specifies that a relative RSSI value be determined at the physical level (the PHY), one aspect of the invention uses the fact that many modern radios include a PHY that provides relatively accurate absolute RSSI measurements. Thus, the reports include the RSSI detected at the PHY of the receiver of the received beacon/probe response. In one embodiment, RSSIs detected at the PHYs are used to determine location information from path loss.

Part of the information received at the WLAN manager 103 is the RSSI at the station receiving the beacon or probe response from the potential rogue AP. These received signal strengths are used, or more particularly, path losses between APs, according to an aspect of Our Rogue Detection Invention, to provide a path loss map, and then further to locate the potential rogue AP.

One embodiment of the method for determining the location of a potential rogue AP whose transmit power is unknown determines the likely locations, e.g., the likelihoods as a function of location by displaying likelihood contours for a set of transmit powers. The set of transmit powers include the likely transmit powers.

Figure 3:
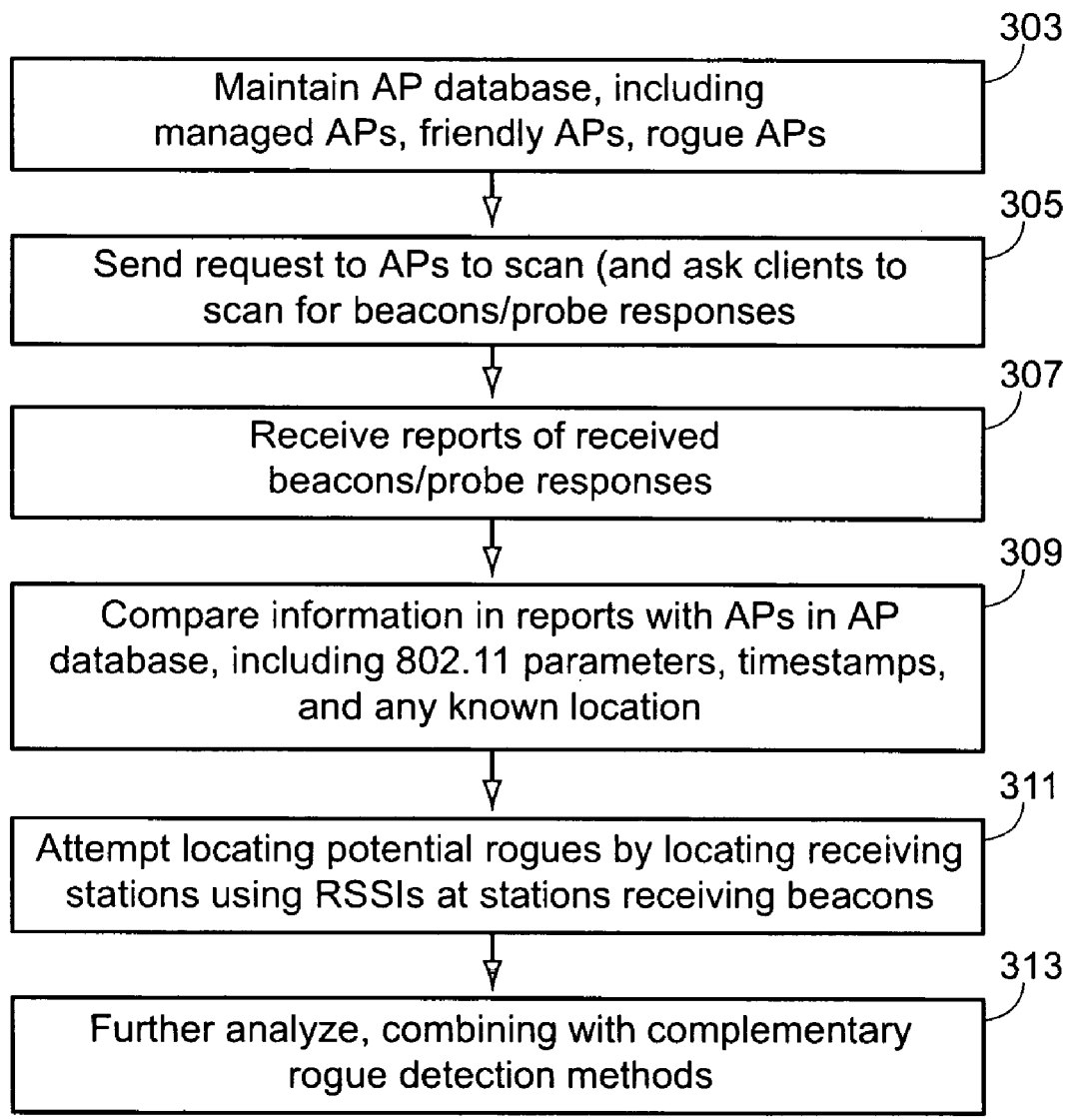
FIG. 3 shows one embodiment of a method for determining the location of a potential rogue AP using received signal strength values at known, e.g., managed APs.

FIG. 3 shows the basic steps of the method. In step 303, the WLAN manager 103 maintains the AP database that includes information about the APs that it manages. The AP database also includes information about the managed APs and about known APs that are in the neighborhood of the managed network or that are known to clients of managed APs, i.e., to managed clients, and that are known to not cause problems, e.g. interference, to the managed wireless network. These APs are the so-called friendly APs. One example of a friendly AP is an AP at a coffee shop where an employee of the enterprise often works using a computer that is a managed client and that associates with this friendly AP. The AP database also includes information about rogue APs. In one embodiment, the AP database is in the Configuration Database and is automatically updated from time to time.

The information stored in the AP database about an AP includes the information from any beacon or probe response frame from such an AP, and any 802.11 information about the AP. In one embodiment, the 802.11 information includes the maximum power, the frequencies, and other 802.11 parameters. In some embodiments, the information further may include location information. In some embodiments, the information for each AP may further include other fields, e.g., fields used for other aspects of wireless network management. For example, in a managed network, it may be that the radio settings of the AP are managed and thus the WLAN manager 103 knows the radio settings for the AP. The location of the AP also may be known.

One aspect of the invention compares information obtained from scanning for beacons or probe responses to information in the AP database. The comparison is of information from managed APs and, in one embodiment, the clients of the managed APs. The information is about beacons or probe responses received from a potential rogue AP with information stored in the AP database about managed APs, friendly APs, and known or suspected rogue APs.

In one embodiment, the maintaining of the AP database includes updating the information in the AP database from time to time. The updating is automatic, e.g., whenever new information is obtained on potential rogue APs or whenever AP configurations are changed.

Thus, in a step 305, the WLAN manager 103 sends one or more requests to one or more managed APs to carry out scanning. In one embodiment, the scanning by the APs is passive scanning. In another embodiment, the scanning by the APs is active scanning of one or more channels where potential rogue APs could be transmitting. Because a rogue AP may be outside the radio range of any managed APs, but still in the range of one or more clients of managed APs, in one embodiment, the request to the managed APs includes an instruction to request such APs' clients to carry out scanning. In one embodiment, the scanning by the managed clients is passive scanning. In another embodiment, the scanning by the managed clients is active scanning of one or more channels where a potential rogue AP could be transmitting.

As a result of such request, in a step 307, the WLAN manager 103 receives reports from the APs and their clients on any beacons and probe responses received in the scanning by the APs and/or clients.

In a step 309, the WLAN manager 103 analyzes information obtained in the received reports about the APs that transmitted the received beacons or probe responses, the analyzing including comparing with information in the AP database. Step 309 is to determine whether or not the transmitting AP is in the AP database. The MAC address (the BSSID) of the AP that sent the response is used to search the AP database for a match. In one embodiment, the analysis includes comparing configuration information in the beacon/probe response with information stored in the AP database about the configuration of managed APs. In one embodiment, the analysis further includes using timing information. In one embodiment, the analysis further includes using known location information of managed APs together with the timing information to determine the approximate location of the potential rogue AP in order to further ascertain whether the AP is likely to be a rogue. The results of the analysis in step 309 include a classification of each AP as a friendly AP or a potential rogue AP.

One embodiment further includes step 311 of attempting to locate the receiving stations receiving the beacon and/or probe responses in order to attempt locating the potential rogue AP(s) to further ascertain whether or not the AP is likely to be a rogue. One location method uses the RSSI at the station receiving the beacon/probe response together with a calibrated path loss model of the environment providing path losses at various locations to/from managed stations at known locations. One such method is described in U.S. patent application Ser. No. 10/629,384 titled "RADIOLOCATION USING PATH LOSS DATA" to inventors Kaiser, et al., assigned to the assignee of the present invention, and incorporated herein by reference.

One embodiment further includes step 313 of combining the results of the analysis with the results of one or more complementary rogue AP detection techniques. One such complementary technique includes a client reporting to a serving AP a failed previous authentication attempt with an AP, for example including identifying the suspected AP by its MAC address. One implementation uses an IEEE 802.1X over IEEE 802.11 security system, according to which client and APs are placed in an authentication server database. When a client authenticates, a session key gets delivered to the client and the access point separately. A client detects a failed authentication when it cannot use the session key after it has authenticated with the authentication server. The client eventually associates with another, now managed AP, and reports the potential rogue AP via the managed AP, to the WLAN manager 103. Such a complementary method is described in pending U.S. patent application Ser. No. 09/917, 122, filed Jul. 27, 2001, titled "ROGUE AP DETECTION," to inventors Halasz, et al., assigned to the assignee of the present invention, and incorporated herein by reference.

Using the radio location, the wireless network administrator (the IT person responsible for WLAN management; a user of the WLAN manager 103) can attempt to physically locate the AP. After locating the AP the administrator can classify the AP as either rogue, managed or friendly and update the WLAN database with information about the AP, including its classification as rogue, managed or friendly. If a rogue AP, the network administrator can issue an alert.

In one embodiment, the set of criteria to determine whether or not the AP is friendly or a rogue is set by the wireless network administrator and stored in the Configuration Database.

Complementary techniques also may be included in the classification to further assess the probability that a detected potential rogue AP is actually a rogue AP.

As an example of a complementary technique for locating a suspected rogue AP, the method may include determining the switch port to which the suspected AP is connected. Methods are known to locate the switch port to which a suspected rogue AP is connected. For example, correlation-based solutions are known that include correlating an IEEE 802.11 MAC address to the wire-side MAC address of the (potential) rogue AP. Once the MAC addresses are correlated, an edge switch may then be searched to locate the MAC address. MAC addresses may also be captured from client stations that are associated with the potential rogue AP, and such captured addresses can also be sued to search an edge switch to locate the AP.

Correlation-based and similar methods have some disadvantages, and often don't work when there is a network address translation (NAT) function involved U.S. patent application Ser. No. 11/073,317 filed 3 Mar. 2005 to inventors Olson, et al., titled METHOD AND APPARATUS FOR LOCATING ROGUE ACCESS POINT SWITCH PORTS IN A WIRELESS NETWORK RELATED PATENT APPLICATIONS, assigned to the assignee of the present invention, and incorporated herein by reference, describes techniques that may be used for successfully locating the switch port. One version includes a special client associating with the potential rogue AP as a client, and sending a discovery packet to the WLAN manager 103 through the (potential) rogue AP. The rogue AP is then connected to the network if the discovery packet is received, and its switch port may then be located. U.S. patent application Ser. No. 11/073, 317 also includes a method of disabling the rogue APs' switch port if necessary.

Figure 4:
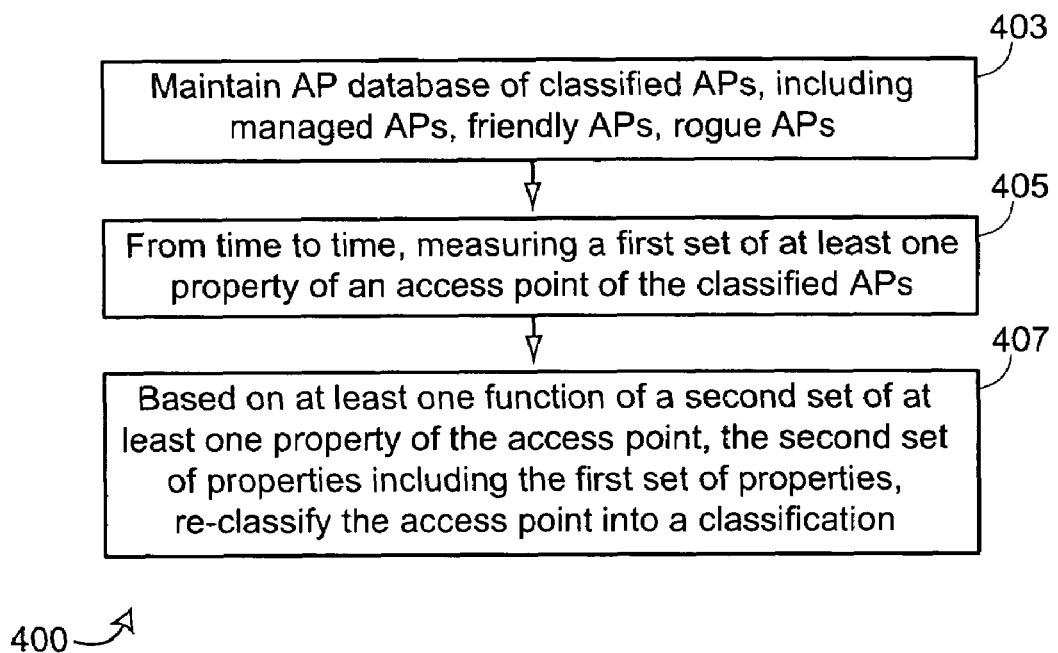
FIG. 4 shows one embodiment of determining whether or not to re-classify one or more access points.

FIG. 4 shows a flowchart of a method embodiment 400 of an aspect of the present invention that includes in 403 maintaining a database of APs that are classified, e.g., into a set of classifications that includes managed APs, friendly APs, and (potentially) rogue APs. The method includes in 405, from time to time, measuring a first set of at least one property of each access point of a set of at least one classified access point of the wireless network. The method further includes, in 407, re-classifying each access point based on at least one function of a second set of at least one property of the access point, the second set of properties including the first set of properties.

In particular, the re-classifying is triggered by at least one function indicative of changes in the second set of properties of the access point.

Thus, an aspect of the invention is to dynamically re-classify classified APs, e.g., the classification into one of a managed AP, a friendly AP, or a rogue of all access points in a managed WLAN system, e.g., the APs in the AP database. In particular, one aspect of the invention is, from time-to-time, dynamically re-classify an access point in real-time based on detection of changes of a function of one or more properties of the access point.

In one version, the re-classification is according to a time-schedule set up as a parameter in the WLAN manager 103. In another version, the re classification is triggered by the detection of a significant change in at least one of the following properties of the access point. In a particular version, when more than one of the following properties changes, the amount of such changes to trigger the reclassification is set to be less than for the trigger when only one property of the following set changes. Furthermore, in yet another version, the re-classification occurs according to a settable time-schedule, and further by the detection of a significant change in at least one of the following properties of the access point.

The properties that trigger the re-classification are, in one embodiment, the following for a particular AP:

1. Detection of changes in the RSSI of packets received at the particular AP from other neighboring APs. In one embodiment, the AP database stores RSSI values to other APs in the AP database. Suppose there are N known APs in the AP database, and suppose the particular AP is the k'th AP, $1 \leq k \leq N$. Denote by $RSSI_{k,i}(t)$ the RSSI received at the k'th AP from the i'th AP at the present time denoted by t, k≠i, 1≤k,i≤N. In one an embodiment, a change of more than a quantity denoted $Thresh_{k,RSSI}$ in a function, denoted $f_{k,RSSI}(RSSI_{k,1}(t), \ldots, RSSI_{k,N}(t))$ of the RSSI is detected. That is, an event is triggered if $\Delta f_{k,RSSI}(RSSI_{k,1}, \ldots, RSSI_{k,N}) \geq Thresh_{k,RSSI}$ for any k, 1≤k≤N, where $\Delta f_{k,RSSI} = f_{k,RSSI}(RSSI_{k,1}(t), \ldots, RSSI_{k,N}(t)) - f_{k,RSSI}(RSSI_{k,1}(t-\Delta t), \ldots, RSSI_{k,N}(t-\Delta t))$.

In one embodiment, t−Δt is the time the last assessment using RSSI was made.

In another embodiment, the AP database stores path losses to the particular AP from known APs. In such a case, Suppose again there are N known APs in the AP database, and suppose the particular AP is the k'th AP, 1≤k≤N. Denote by $PL_{k,i}(t)$ the path loss from the ith AP to the k'th AP, k≠i, 1≤k,i≤N. In one an embodiment, a change of more than a quantity, denoted $Thresh_{k,PL}$ in a function, denoted $f_{k,PL}(PL_{k,1}(t), \ldots, PL_{k,N}(t))$ of the path losses at the present time, denoted t from a previous time, denoted t−Δt is detected. That is, an event is triggered if $\Delta f_{k,PL}(PL_{k,1}, \ldots, PL_{k,N}) \geq Thresh_{k,PL}$ for any k, 1≤k≤N, where $\Delta f_{k,PL} = f_{k,PL}(PL_{k,1}(t), \ldots, PL_{k,N}(t)) - f_{k,PL}(PL_{k,1}(t-\Delta t), \ldots, PL_{k,N}(t-\Delta t))$.

In one embodiment, t−Δt is the time the last assessment using path loss was made.

2. In the case of a managed access point, detection of new or different configuration settings, e.g., as expressed in values of planning parameters may be used. In a managed network, the WLAN manager 103 determines a set of radio planning parameters for each managed access point, including, as part of the RF plan, the channel of operation and the transmit power setting for the AP. Other parameters also are involved, for example, antenna gain settings, data rates, etc. For example, in the embodiment in which the WLAN manager runs IOS (Cisco Systems, Inc., San Jose, Calif.), the IOS line command show running-config for a particular managed AP provides a listing of the current configuration settings of the AP.

Suppose there are $n_p$ planning parameters for the particular AP, and again suppose that the particular AP is the k'th AP, 1≤k≤N. Denote by $P_{k,i}(t)$ the i'th parameter at time t, 1≤i≤$n_p$. In one embodiment, a threshold denoted $Thresh_{p,k}$ is compared to a change in a function, denoted $f_{k,P}(P_{k,1}(t), \ldots, P_{k,n_p}(t))$ of the parameters at time t from the value at a previous time Δt earlier. That is, an event is triggered if $\Delta f_{k,P}(P_{k,1}, \ldots, P_{k,n_p}) \geq Thresh_{k,P}$ for any k, 1≤k≤N, where $\Delta f_{k,P} = f_{k,P}(P_{k,1}(t), \ldots, P_{k,n_p}(t)) - f_{k,P}(P_{k,1}(t-\Delta t), \ldots, P_{k,n_p}(t-\Delta t))$.

In one embodiment, t−Δt is the time the last assessment using the parameters was made.

See the above discussion of rogue access point determination for some parameters used herein.

3. RF parameter/behavior changes such as transmission timings or data path loss may be used to trigger an event. See above for path loss changes. Similarly, a functions and threshold change can be designed to trigger a re-classification as a function of the transmission timing from neighboring APs. See, for example, commonly assigned U.S. patent application Ser. No. 10/803,367 filed Mar. 18, 2004 to inventors Crawford, et al. titled RADIOLOCATION IN A WIRELESS NETWORK USING TIME DIFFERENCE OF ARRIVAL for a description of an access point that includes a method to determining the time of arrival at the access point from neighboring access points. The contents of U.S. patent application Ser. No. 10/803,367 are incorporated herein by reference.

Suppose again there are N known APs in the AP database, and suppose the particular AP is the k'th AP, 1≤k≤N. Denote by $T_{k,i}(t)$ the transmission time from the ith AP to the k'th AP at some time denoted t, k≠i, 1≤k,i≤N, and consider changed from an earlier time (t−Δt). In one an embodiment, a change of more than a quantity, denoted $Thresh_{k,T}$ in a function, denoted $f_{k,T}(T_{k,1}(t), \ldots, T_{k,N}(t))$ of the transmission times is detected. Denote That is, an event is triggered if $\Delta f_{k,T}(T_{k,1}, \ldots, T_{k,N}) \geq Thresh_{k,T}$ for any k, 1≤k≤N, where $\Delta f_{k,T}(T_{k,1}, \ldots, T_{k,N}) = f_{k,T}(T_{k,1}(t), \ldots, T_{k,N}(t)) - f_{k,T}(T_{k,1}(t-\Delta t), \ldots, T_{k,N}(t-\Delta t))$.

In one embodiment, t−Δt is the time the last assessment using the transmission times was made.

4. Detecting new network address changes or changes in the data framing of an AP can trigger an event.

5. Network management software in a WLAN manager such as manager 103 is known that includes wired discovery methods to discover Access Points. For example, "in the wire" detection via Cisco Discovery Protocol ("CDP," from Cisco Systems, Inc., San Jose, Calif.), and other wired side discovery methods are known. Typically, one or more protocols are used to detect devices connected in the LAN, including SNMP, Telnet, Cisco Discovery Protocol (Cisco Systems, Inc., San Jose, Calif.), and so forth. A combination of wired side discovery methods is very reliable and proven as it can detect an AP anywhere in the WLAN irrespective of its physical location. A re-classification may occur when a new AO is thus discovered.

6. Detecting a significant location change in the case the AP was previously at a known location may trigger re-classification. Many WLAN managers, such as WLAN manager 103 include a location determining method that may be based on one or more methods. See, for example, above-mentioned U.S. patent application Ser. No. 10/629,384 titled "RADIOLOCATION USING A PATH LOSS DATA" for a method that uses path loss. See also above-mentioned U.S. patent application Ser. No. 10/803,367 titled RADIOLOCATION IN A WIRELESS NETWORK USING TIME DIFFERENCE OF ARRIVAL.

Suppose again there are N known APs in the AP database, and suppose the particular AP is the k'th AP, 1≤k≤N. Denote by $X_k(t)$ the determined location of the k'th AP, at some time t, 1≤k≤N, and consider changes from an earlier time (t−Δt). In one an embodiment, a change of more than a quantity, denoted $Thresh_{k,X}$ in a function, denoted $f_{k,X}(X_k)$ of the location(s) is detected. That is, an event is triggered if $\Delta f_{k,X}(X_k) \geq Thresh_{k,X}$ for any k, 1≤k≤N, where $\Delta f_{k,X}(X_k) = f_{k,X}(X_k(t)) - f_{k,X}(X_k(t-\Delta t))$.

In alternate embodiments, location changes are incorporated in the functions of path losses and/or transmission times in those APs that include such facility.

In alternate embodiments, rather than a change in a function being detected, a function of changes in the particular values is detected. For example, in the case of location, again denote by $X_k(t)$ the determined location of the k'th AP, at some time t, $1 \leq k \leq N$, and consider changes from an earlier time (t−Δt). In one an embodiment, a function of change of location is evaluated. Denote by $\Delta X_k(t)$ the changed from time t−Δt to ti, e.g., $\Delta X_k(t)=X_k(t)-X_k(t-\Delta t)$ Consider a function $F_{k,X}(\Delta X_k(t))$, and let $\text{Thr}_{k,X}$ be a threshold. Then, an event is triggered if $$F_{k,X}(\Delta X_k) \geq \text{Thr}_{k,X} \text{ for any } k, 1 \leq k \leq N.$$

Note that some of the detection criteria are measures that may be configured to occur in real time, e.g., location changes in some configurations, while others may occur at scheduled times, e.g., the "in the wire" re-discovery of AP wired network location and address. In one embodiment, the re-classification occurs both in real time, using the real-time varying parameters, also after a scheduled evaluation at schedules times.

To help reduce the degree of false-positives such a methodology might present, this innovation also makes use of an aggregate "trust level" for AP classification. Thus, for a number $N_C$ of criteria, each determined according to changes in a respective function, denoted for a criterion $C_j$, $1 \leq j \leq N_C$, as $f_{k,j}(\,)$, with the change denoted as $\Delta f_{k,j}(\,)$, the aggregate trust level $Q_k$ for the k'th AP of a set of N APs, $1 \leq k \leq N$, the aggregate trust level is a function:

$$Q_k = \sum_{j=1}^{N_C} \alpha_{k,j} \Delta f_{k,j}(\cdot), 1 \leq k \leq N,$$

where $\alpha_{k,j}$, $1 \leq j \leq N_C$ denotes weightings for each individual parameter-based function for the k'th access point that contributes to the re-classification trigger. The $\alpha_{k,j}$, $1 \leq j \leq N_C$, $1 \leq k \leq N$ include any scalings required to make the $f_{k,j}(\,)$ functions have the same scales and units. A threshold denoted $\text{Thresh}_{k,Q}$ is defined for the k'th AP, and thus, in one embodiment, for the k'th AP of a set of N APs, $1 \leq k \leq N$, re-classification is triggered if $$Q_k = \sum_{j=1}^{N_C} \alpha_{k,j} \Delta f_{k,j}(\cdot) \geq \text{Thresh}_{k,Q} \quad \text{for any } k, 1 \leq k \leq N.$$

Such a weighting methodology could reduce the likelihood of having "false positives" by changing the weighting scheme, e.g., the values of $\alpha_{k,j}$, $1 \leq j \leq N_C$ over time for APs, i.e., for values of k that were classified/discovered/re-classified as possible rogues. That is, the weightings used to determine the aggregate trust levels depend on the most recent classification of the access point. Such re-classifying is carried out by the user as friendly, even under the new conditions that generated the adjustment. That is, some self-correcting aspects are built into the dynamic classification, so that different measures can be weighted against their predicted success rates in AP classification.

It should be appreciated that although the invention has been described in the context of the IEEE 802.11 standard, the invention is not limited to such contexts and may be utilized in various other applications and systems, for example in other wireless networks that conform to other standards and for other applications, including, for example other WLAN standards and other wireless network standards. Applications that can be accommodated include IEEE 802.11 wireless LANs and links, wireless Ethernet, HIPERLAN 2, European Technical Standards Institute (ETSI) broadband radio access network (BRAN), and multimedia mobile access communication (MMAC) systems, wireless local area networks, local multipoint distribution service (LMDS) IF strips, wireless digital video, wireless USB links, wireless IEEE 1394 links, TDMA packet radios, low-cost point-to-point links, voice-over-IP portable "cell phones" (wireless Internet telephones), etc.

The methodologies described herein are, in one embodiment, performable by a machine which includes a one or more processors that accept code segments containing instructions. For any of the methods described herein, when the instructions are executed by the machine, the machine performs the method. Any machine capable of executing a set of instructions (sequential or otherwise) that specify actions to be taken by that machine are included. Thus, one a typical machine may be exemplified by a typical processing system that includes one or more processors. Each processor may include one or more of a CPU, a graphics processing unit, and a programmable DSP unit. The processing system further may include a memory subsystem including main RAM and/or a static RAM, and/or ROM. A bus subsystem may be included for communicating between the components. If the processing system requires a display, such a display may be included, e.g., a liquid crystal display (LCD) or a cathode ray tube (CRT) display. If manual data entry is required, the processing system also includes an input device such as one or more of an alphanumeric input unit such as a keyboard, a pointing control device such as a mouse, and so forth. The term memory unit as used herein also encompasses a storage system such as a disk drive unit. The processing system in some configurations may include a sounds output device, and a network interface device. The memory subsystem thus includes a carrier medium that carries machine readable code segments (e.g., software) including instructions for performing, when executed by the processing system, one of more of the methods described herein. The software may reside in the hard disk, or may also reside, completely or at least partially, within the RAM and/or within the processor during execution thereof by the computer system. Thus, the memory and the processor also constitute carrier medium carrying machine readable code.

In alternative embodiments, the machine operates as a standalone device or may be connected, e.g., networked to other machines, in a networked deployment, the machine may operate in the capacity of a server or a client station machine in server-client station network environment, or as a peer machine in a peer-to-peer or distributed network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine.

Note that while some diagram(s) only show(s) a single processor and a single memory that carries the code, those in the art will understand that many of the components described above are included, but not explicitly shown or described in order not to obscure the inventive aspect. For example, while only a single machine is illustrated, the term "machine" shall also be taken to include any collection of machines that individually or jointly execute a set (or multiple sets) of instructions to perform any one or more of the methodologies discussed herein.

Thus, one embodiment of each of the methods described herein is in the form of a computer program that executes on a processing system, e.g., a one or more processors that are part of an access point and/or a WLAN manager. Thus, as will be appreciated by those skilled in the art, embodiments of the present invention may be embodied as a method, an apparatus such as a special purpose apparatus, an apparatus such as a data processing system, or a carrier medium, e.g., a computer program product. The carrier medium carries one or more computer readable code segments for controlling a processing system to implement a method. Accordingly, aspects of the present invention may take the form of a method, an entirely hardware embodiment, an entirely software embodiment or an embodiment combining software and hardware aspects. Furthermore, the present invention may take the form of carrier medium (e.g., a computer program product on a computer-readable storage medium) carrying computer-readable program code segments embodied in the medium.

The software may further be transmitted or received over a network via the network interface device. While the carrier medium is shown in an exemplary embodiment to be a single medium, the term "carrier medium" should be taken to include a single medium or multiple media (e.g., a centralized or distributed database, and/or associated caches and servers) that store the one or more sets of instructions. The term "carrier medium" shall also be taken to include any medium that is capable of storing, encoding or carrying a set of instructions for execution by the machine and that cause the machine to perform any one or more of the methodologies of the present invention. A carrier medium may take many forms, including but not limited to, non-volatile media, volatile media, and transmission media. Non-volatile media includes, for example, optical, magnetic disks, and magneto-optical disks. Volatile media includes dynamic memory, such as main memory. Transmission media includes coaxial cables, copper wire and fiber optics, including the wires that comprise a bus subsystem. Transmission media also may also take the form of acoustic or light waves, such as those generated during radio wave and infrared data communications. For example, the term "carrier medium" shall accordingly be taken to included, but not be limited to, solid-state memories, optical and magnetic media, and carrier wave signals.

It will be understood that the steps of methods discussed are performed in one embodiment by an appropriate processor (or processors) of a processing (i.e., computer) system executing instructions (code segments) stored in storage. It will also be understood that the invention is not limited to any particular implementation or programming technique and that the invention may be implemented using any appropriate techniques for implementing the functionality described herein. The invention is not limited to any particular programming language or operating system.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner, as would be apparent to one of ordinary skill in the art from this disclosure, in one or more embodiments.

Similarly, it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

"Variants of the IEEE 802.11 standard" as used herein means the variants and proposed variants of the IEEE 802.11 standard. Variants are versions defined in clauses of the standard and proposed amendments of the standard.

Note that an access point is also called a base station and a cell station in different contexts.

All publications, patents, and patent applications cited herein are hereby incorporated by reference.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

Similarly, it is to be noticed that the term coupled, when used in the claims, should not be interpreted as being limitative to direct connections only. Thus, the scope of the expression a device A coupled to a device B should not be limited to devices or systems wherein an output of device A is directly connected to an input of device B. It means that there exists a path between an output of A and an input of B which may be a path including other devices or means.

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

We claim:

1. A method of operating a processing system in a wireless network, the wireless network including at least one access point ("AP"), the method comprising:

storing a classification for each of a set of AP classifications for each access point of a set of at least one classified access point of the wireless network, wherein the wireless network is a managed wireless network, and wherein set of AP classifications includes a managed AP, A friendly AP, and a rogue AP, a managed access point being an access point whose channel of operation and transmit power setting are managed by one or more management entities;

from time-to-time, measuring a first set of at least one property of each already classified access point of the set of at least one classified access point of the wireless network; and re-classifying each already classified access point in response to the measuring based on at least one function of a second set of at least one property of the access point, the second set of properties including the first set of properties, such that each already classified access point of the set of at least one access point is already classified according to the set of AP classifications, and wherein the re-classifying is into one of the AP classifications.

2. A method as recited in claim 1, wherein the re-classifying is triggered by at least one function indicative of a significant changes in one or more of the second set of properties of the already classified access point.

3. A method as recited in claim 2, wherein the re-classifying is triggered by the at least one function indicative of a significant changes in one or more of the second set of properties of the already classified access point changing by at least one corresponding pre-set threshold.

4. A method as recited in claim 3, wherein the re-classifying is triggered by a change in any one of the one or more of the second set of properties of the already classified access point changing by a corresponding pre-set threshold.

5. A method as recited in claim 2, wherein the second set of properties of the classified access point whose significant change triggers re-classifying includes:

detection of changes in the RSSI of packets received at the particular AP from other neighboring APs;

in the case of the AP having been already classified as a managed access point, detection of new or different configuration settings;

detecting significant changes in RF parameters including one or more of:

transmission timings to or from other APs, and path loss to or from other APs;

detecting new network address changes of an AP;

detecting a significant change in the data framing of an AP; and detecting a significant location change in the case the AP was previously at a known location.

6. A method as recited in claim 1, wherein the at least one function of a second set of at least one property of the already classified access point includes the time of the re-classifying, such that the re-classification is according to a pre-set time-schedule.

7. A method as recited in claim 1, wherein the first set of one or more properties of the already classified access point includes at least one of:

in-wire wireless station detection;

a determined location of the station;

radio signal strength measurements at the access point of signals from other APs; and determined transmission times for the access points to and/or from one or more other wireless stations of the wireless network.

8. A method as recited in claim 1, wherein the storing the classifications of classified access points of the wireless network is in a database, the database maintained in a wireless manager coupled to each managed AP of the wireless network.

9. A method as recited in claim 1, wherein the wireless network conforms to one of the 801.11 standards or variations thereof, wherein the re-classification of an already classified AP is based on at least one of:

the already classified AP's BSSID;

the channel any beacon or probe response from the already classified AP was received on;

the MAC address of the station receiving a beacon or probe response;

the signal strength detected at the physical layer level of the receiving station of the beacon or probe response;

any other measures of received signal quality of the received beacon or probe response available at the physical layer level of the receiving station; and/or received beacons and probe responses from other APs, and wherein the beacon or probe response received from the already classified AP includes one or more of:

the SSID in the beacon or probe response;

beacon time (TSF timer) information sent in the form of TSF offset determined by comparing the timestamp in the beacon/probe response with the TSF timer at the managed AP receiving the response or at the managed client receiving the response; and/or configuration parameters included in the received beacon/probe response.

10. A method as recited in claim 1, further comprising:

determining for each already classified AP an aggregate trust level, such trust level being a weighted sum of functions indicative of changes in one or more parameters of the second set of parameters.

11. A method as recited in claim 10, wherein the weightings used to determine the aggregate trust levels depend on the most recent classification of the already classified access point.

12. A tangible computer readable storage medium containing one or more computer readable code segments that when executed by at least one processor of a processing system cause carrying out of a method in a wireless network, the wireless network including at least one access point ("AP"), the method comprising:

storing a classification for each of a set of AP classifications for each access point of a set of at least one already classified access point of the wireless network, wherein the wireless network is a managed wireless network, and wherein set of AP classifications includes a managed AP, A friendly AP, and a rogue AP, a managed access point being an access point whose channel of operation and transmit power setting are managed by one or more management entities;

from time-to-time, measuring a first set of at least one property of each access point of the set of at least one already classified access point of the wireless network; and re-classifying each already classified access point in response to the measuring based on at least one function of a second set of at least one property of the already classified access point, the second set of properties including the first set of properties, such that each already classified access point of the set of at least one access point is already classified according to the set of AP classifications, and wherein the re-classifying is into one of the AP classifications.

13. A tangible computer readable storage medium as recited in claim 12, wherein the re-classifying is triggered by at least one function indicative of a significant changes in one or more of the second set of properties of the already classified access point.

14. A tangible computer readable storage medium as recited in claim 13, wherein the re-classifying is triggered by the at least one function indicative of a significant changes in one or more of the second set of properties of the already classified access point changing by at least one corresponding pre-set threshold.

15. A tangible computer readable storage medium as recited in claim 14, wherein the re-classifying is triggered by a change in any one of the one or more of the second set of properties of the already classified access point changing by a corresponding pre-set threshold.

16. A tangible computer readable storage medium as recited in claim 13, wherein the second set of properties of the already classified access point whose significant change triggers re-classifying includes:

detection of changes in the RSSI of packets received at the particular AP from other neighboring APs;

in the case of the AP having already been classified as a managed access point, detection of new or different configuration settings;

detecting significant changes in RF parameters including one or more of:

transmission timings to or from other APs; and path loss to or from other APs;

detecting new network address changes of an AP;

detecting a significant change in the data framing of an AP; and detecting a significant location change in the case the AP was previously at a known location.

17. A tangible computer readable storage medium as recited in claim 12, wherein the at least one function of a second set of at least one property of the already classified access point is the time, such that the re-classification is according to a pre-set time-schedule.

18. A tangible computer readable storage medium as recited in claim 12, wherein the first set of one or more properties of the already classified access point includes at least one of:

in-wire wireless station detection;

a determined location of the station;

radio signal strength measurements at the access point of signals from other APs; and determined transmission times for the access points to and/or from one or more other wireless stations of the wireless network.

19. A tangible computer readable storage medium as recited in claim 12, wherein the storing the classifications of already classified access points of the wireless network is in a database, the database maintained in a wireless manager coupled to each managed AP of the wireless network.

20. A tangible computer readable storage medium as recited in claim 12, wherein the wireless network conforms to one of the 801.11 standards or variations thereof wherein the re-classification of an AP is based on at least one of:

the AP's BSSID;

the channel any beacon or probe response from the AP was received on;

the MAC address of the station receiving a beacon or probe response;

the signal strength detected at the physical layer level of the receiving station of the beacon or probe response;

any other measures of received signal quality of the received beacon or probe response available at the physical layer level of the receiving station; and received beacons and probe responses from other APs;

and wherein the beacon or probe response received from the AP includes one or more of:

the SSID in the beacon or probe response;

beacon time (TSF timer) information. In one embodiment, this is sent in the form of TSF offset determined by comparing the timestamp in the beacon/probe response with the TSF timer at the managed AP receiving the response or at the managed client receiving the response; and configuration parameters included in the received beacon/probe response.

21. A tangible computer readable storage medium as recited in claim 12, further comprising:

determining for each already classified AP an aggregate trust level, such trust level being a weighted sum of functions indicative of changes in one or more parameters of the second set of parameters.

22. A tangible computer readable storage medium as recited in claim 21, wherein the weightings used to determine the aggregate trust levels depend on the most recent classification of the already classified access point.

23. An apparatus in a wireless network, the wireless network including at least one access point ("AP"), the apparatus comprising:

means for storing a classification for each of a set of AP classifications for each access point of a set of at least one already classified access point of the wireless network, wherein the wireless network is a managed wireless network, and wherein set of AP classifications includes a managed AP, A friendly AP, and a rogue AP, a managed access point being an access point whose channel of operation and transmit power setting are managed by one or more management entities;

means for measuring from time-to-time a first set of at least one property of each access point of the set of at least one already classified access point of the wireless network; and means for re-classifying each already classified access point in response to the measuring by the means for measuring, the re-classifying by the means for re-classifying based on at least one function of a second set of at least one property of the already classified access point, the second set of properties including the first set of properties, such that each already classified access point of the set of at least one access point is already classified according to the set of AP classifications, and wherein the re-classifying is into one of the AP classifications.

24. An apparatus as recited in claim 23, wherein the means for re-classifying is triggered to reclassify by at least one function indicative of significant changes in one or more of the second set of properties of the already classified access point.

25. An apparatus as recited in claim 23, further comprising: means for determining for each already classified AP an aggregate trust level, such trust level being a weighted sum of functions indicative of changes in one or more parameters of the second set of parameters.

26. An apparatus as recited in claim 25, wherein the weightings used to determine the aggregate trust levels depend on the most recent classification of the already classified access point.

* * * * *